United States Patent
Sung et al.

(10) Patent No.: US 7,905,551 B2
(45) Date of Patent: Mar. 15, 2011

(54) SEATBACK FRAME STRUCTURE FOR VEHICLES

(75) Inventors: Young Bok Sung, Hwaseong-si (KR); Sang Do Park, Ansan-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 149 days.

(21) Appl. No.: 12/327,620

(22) Filed: Dec. 3, 2008

(65) Prior Publication Data

US 2009/0152929 A1 Jun. 18, 2009

(30) Foreign Application Priority Data

Dec. 18, 2007 (KR) .......................... 10-2007-0133182

(51) Int. Cl.
*B60N 2/68* (2006.01)
(52) U.S. Cl. .................................. 297/452.18; 297/391
(58) Field of Classification Search .................. 297/391, 297/410, 452.18, 463.1
See application file for complete search history.

(56) References Cited

U.S. PATENT DOCUMENTS

| | | | |
|---|---|---|---|
| 6,789,845 B2* | 9/2004 | Farquhar et al. | 297/216.12 |
| 7,165,814 B2* | 1/2007 | Gans et al. | 297/391 |
| 7,581,792 B2* | 9/2009 | Saberan | 297/452.18 |
| 2004/0227389 A1* | 11/2004 | Yoshida | 297/452.18 |
| 2006/0071517 A1 | 4/2006 | Humer et al. | |
| 2006/0244298 A1* | 11/2006 | Runde | 297/391 |
| 2006/0261661 A1* | 11/2006 | Kraft et al. | 297/463.1 |
| 2008/0265639 A1* | 10/2008 | Siegrist et al. | 297/217.3 |
| 2009/0045658 A1* | 2/2009 | Humer et al. | 297/216.12 |

* cited by examiner

*Primary Examiner* — Peter R. Brown
(74) *Attorney, Agent, or Firm* — Morgan, Lewis & Bockius LLP

(57) ABSTRACT

A seatback frame structure is provided for the manufacture of a seat of a vehicle. The seatback frame structure includes a pair of side brackets and an upper cross member. The side brackets are coupled at lower ends thereof to left and right sides of a seat frame. The upper cross member is transversely mounted between the upper ends of the side brackets, and a headrest is placed on the upper portion of the upper cross member. Each of opposite ends of the upper cross member comprises a downwardly inclined surface, and is coupled to the upper end of a corresponding side bracket.

19 Claims, 4 Drawing Sheets

SEATBACK FRAME STRUCTURE FOR VEHICLES

CROSS-REFERENCE TO RELATED APPLICATION

The present application claims priority to Korean Application No. 10-2007-0133182 filed Dec. 18, 2007, the entire contents of which applications is incorporated herein for all purposes by this reference.

BACKGROUND OF THE INVENTION

1. Field of the Invention

The present invention relates to a seatback frame structure for manufacturing a seat of a vehicle.

2. Description of Related Art

As well known to those skilled in the art, a vehicle seat includes a seat portion on which a passenger sits, a back portion against which a passenger's back rests, and a headrest which supports the neck and the head. Such a vehicle seat is designed to offer comfort to a passenger when he or she sits in the seat, in addition to ensuring the safety of the passenger.

A conventional frame structure used for such a vehicle seat is shown in FIG. 1.

In a conventional seatback frame structure 110 for vehicles, left and right side brackets 120a and 120b are rotatably coupled at the lower ends thereof to a seat frame 125. The upper ends of the side brackets 120a and 120b are coupled to each other via an upper cross member 130.

A headrest is placed on the upper portion of the upper cross member 130. A plurality of poles is provided on the lower portion of the headrest. The poles are inserted into pole guides 140 which are secured to the upper cross member 130, and are used to adjust the height of the headrest.

In the conventional seatback frame structure 110, since the upper cross member 130 is constructed to have the simple shape of a "—", different side brackets are required for different kinds of vehicle seats, which have different seatback heights or are rounded at sides of the seatback. Thus, the conventional seatback frame structure 110 has a problem in that frame compatibility between different kinds of vehicles is low, so that the freedom of design is reduced.

The conventional seatback frame structure 110 has another problem in that each pole guide 140 is secured to the upper cross member 130 using a pole guide tube 145, so that manufacturing costs and weight are increased, due to the use of an additional component, namely the pole guide tube 145. The conventional seatback frame structure 110 has a further problem in that product variation and welding variation are caused by the increase in the number of components, and thus gaps or other defects related to the coupling of the headrest may occur, and thus operating efficiency is low.

Further, as shown in FIG. 2, an edge 132 of the upper cross member 130, which is positioned behind the seatback, is bent downwards. Thus, in the event of a head-on collision, the head of a passenger, who sits in the back seat, collides with the exposed edge 132, so that the passenger may be injured, and thereby vehicle safety legislation may not be satisfied. Further, space for mounting a power motor in the upper cross member 130 is insufficient, and working space is small because of the rear edge 132, so that productivity is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for a seatback frame structure for vehicles, with which it is possible to adjust the height of a seatback, and round a side of the seatback, so that an additional side bracket is not required depending on the kind of vehicle, and thus frame compatibility between vehicles is considerably improved, and various designs may be applied.

An aspect of the present invention is directed to a seatback frame structure for vehicles including a pair of side brackets coupled at lower ends thereof to left and right sides of a seat frame, and/or an upper cross member transversely mounted between upper ends of the side brackets and including a middle portion and inclined portions formed at both distal ends of the middle portion, wherein each distal end of the inclined portion may be configured to be lower than the middle portion and a headrest may be placed on an upper portion of the upper cross member.

The middle portion may be linear and substantially-horizontally aligned between upper ends of the side brackets. The inclined portion may be linearly-shaped and inclined downwards from the distal end of the middle portion with a predetermined angle. The inclined portion may be curved downwards from the distal end of the middle portion.

The middle portion may be curved and substantially-horizontally aligned between upper ends of the side brackets. The inclined portion may be linearly-shaped and inclined downwards from the distal end of the middle portion with a predetermined angle. The inclined portion may be curved downwards from the distal end of the middle portion.

The upper cross member may include a height adjusting gap which is defined between each of upper and lower ends of a welded portion, provided on each of the opposite ends of the upper cross member and an associated side bracket, the height adjusting gap allowing a height of the upper cross member mounted to the side brackets to be adjusted. The height adjusting gap may be about 10 mm.

The upper cross member may include a support portion which may be bent at a center thereof in a "U" shape opened in a direction of a back seat and extends in a longitudinal direction thereof An upper edge of the support member may be first bent upwards, and subsequently, may be bent towards a front of a vehicle, so that an upper flange is provided on a rear portion of the upper cross member. A lower edge of the support member may be first bent downwards, and subsequently, may be bent towards a front of a vehicle, so that a lower flange is provided on a rear portion of the upper cross member. A lower edge of the support member may be first bent downwards and subsequently may be bent towards a front of a vehicle, so that a lower flange is provided on a rear portion of the upper cross member. A hole may be formed at support member in a vertical direction thereof so that a pole guide may be fitted into the hole. A receiving member may be formed downwards around the hole and may be inclined toward center of longitudinal axis of the guide pole with a predetermined angle. The pole guide may include a protrusion radially extending with a predetermined length at upper portion thereof.

A hole may be formed in a vertical direction of the upper portion of the upper cross member so that a pole guide may be fitted into the hole. A receiving member may be formed downwards around the hole and may be inclined toward center of longitudinal axis of the guide pole with a predetermined angle. The pole guide may include a protrusion radially extending with a predetermined length at upper portion thereof Another aspect of the present invention is directed to a passenger vehicle which may include any of the above-described seatback frame structures.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 4A and 4B are perspective views showing an upper cross member of an exemplary seatback frame structure for vehicles in accordance with the present invention, in which FIG. 4A is a front perspective view of the upper cross member and FIG. 4B is a back perspective view of the upper cross member.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
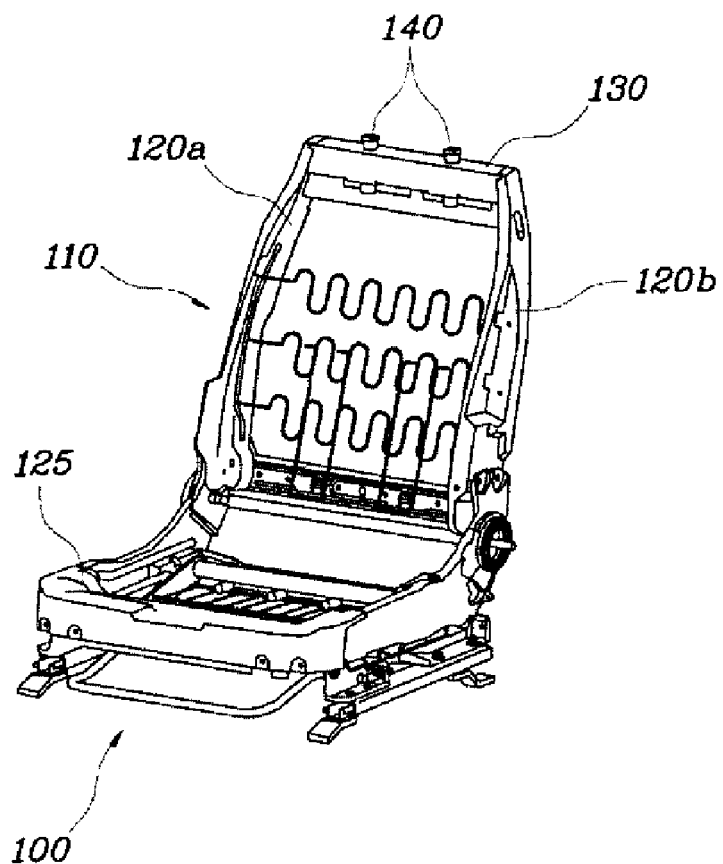
FIG. 1 is a perspective view showing a conventional seatback frame structure for vehicles.
Figure 2:
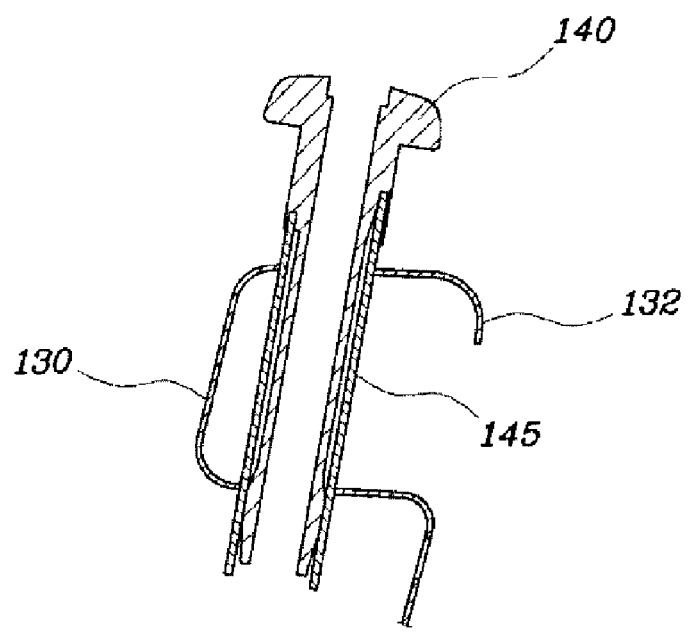
FIG. 2 is a sectional view showing the conventional seatback frame structure for vehicles.
Figure 3:
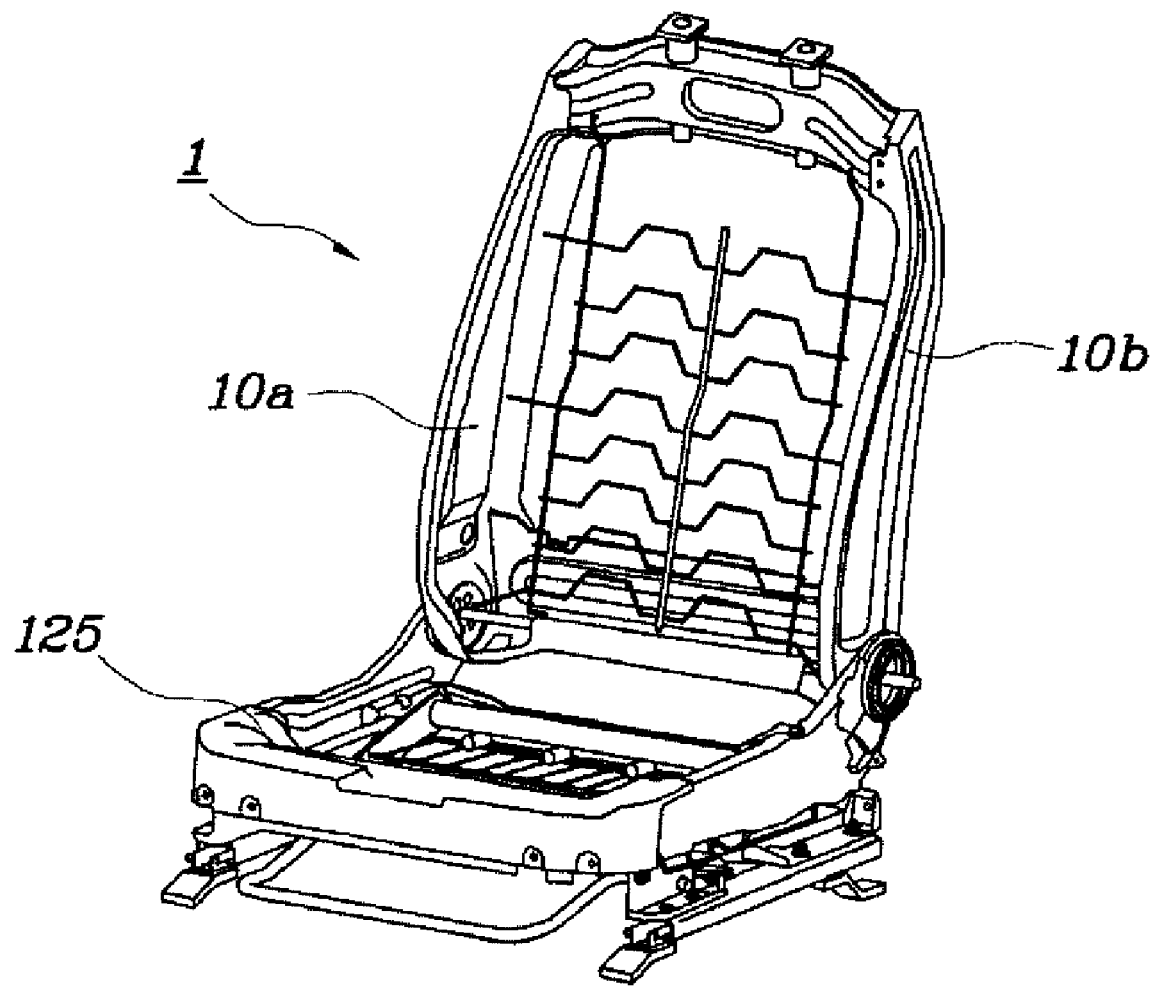
FIG. 3 is a perspective view showing an exemplary seatback frame structure for vehicles in accordance with the present invention.

As shown in FIG. 3, a seatback frame structure 1 includes a pair of side brackets 10a and 10b, which are rotatably coupled at lower ends thereof to a seat frame 125.

The side brackets 10a and 10b are spaced apart from each other, and an upper cross member 20 is transversely provided between the upper ends of the side brackets 10a and 10b to couple the side brackets 10a and 10b to each other. A headrest is mounted to the upper portion of the upper cross member 20, and is welded at opposite ends thereof to the upper ends of the side brackets 10a and 10b.

Figure 4A:
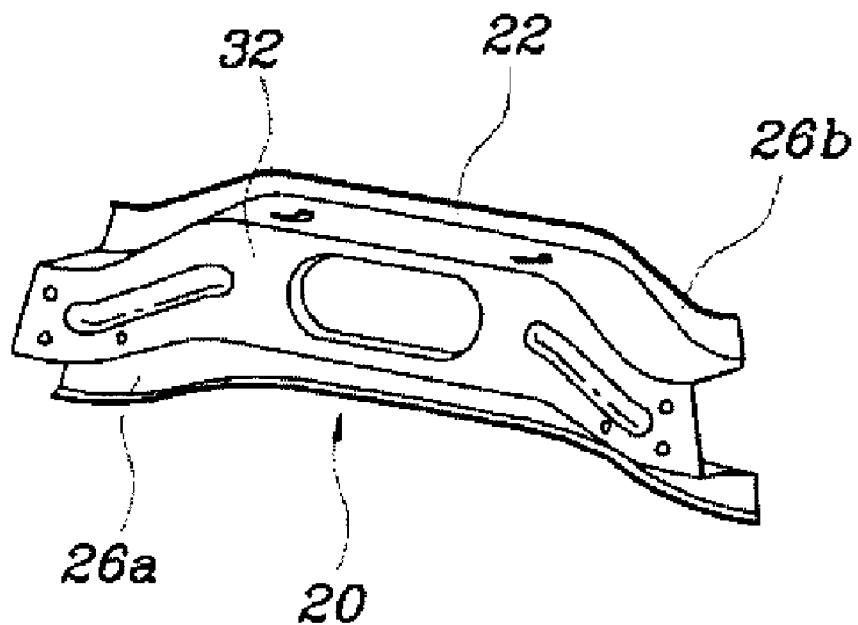
Figure 4B:
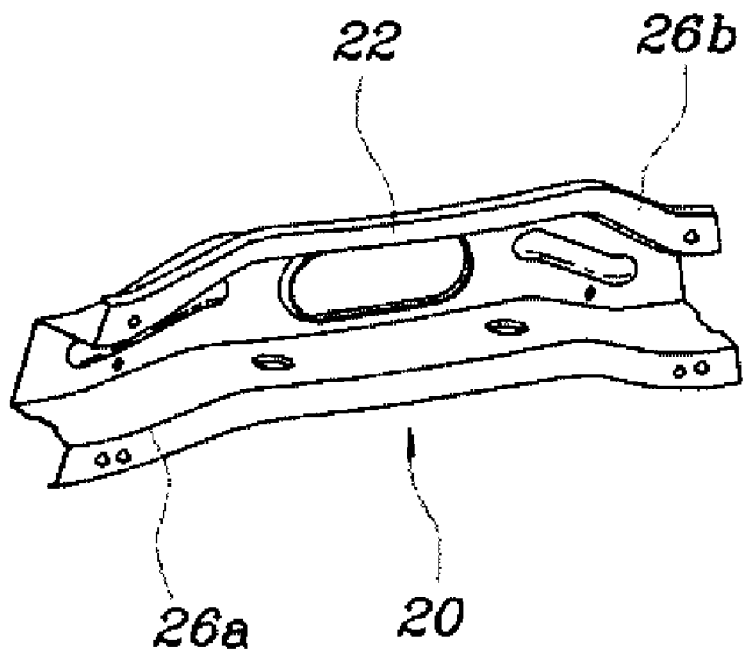

The upper cross member 20 has on opposite ends thereof downwardly inclined surfaces 26a and 26b to be coupled to the side brackets 10a and 10b. As shown in FIGS. 4A and 4B, a linear portion 22 is provided between the inclined surfaces 26a and 26b in such a way as to be horizontally placed on the central portion of the upper cross member 20. The inclined surfaces 26a and 26b are provided on the opposite ends of the linear portion 22 in such a way as to be inclined downwards.

As such, the linear portion 22 is provided on the central portion of the upper cross member 20, and the inclined surfaces 26a and 26b are provided on the opposite ends of the linear portion 22, so that the upper cross member 20 couples the upper ends of the side brackets 10a and 10b to each other in a circular shape.

That is, the inclined surfaces 26a and 26b form a curved edge, in place of the conventional "—"-shaped edge, thus allowing the upper ends of sides of the seatback to be rounded.

Figure 5:
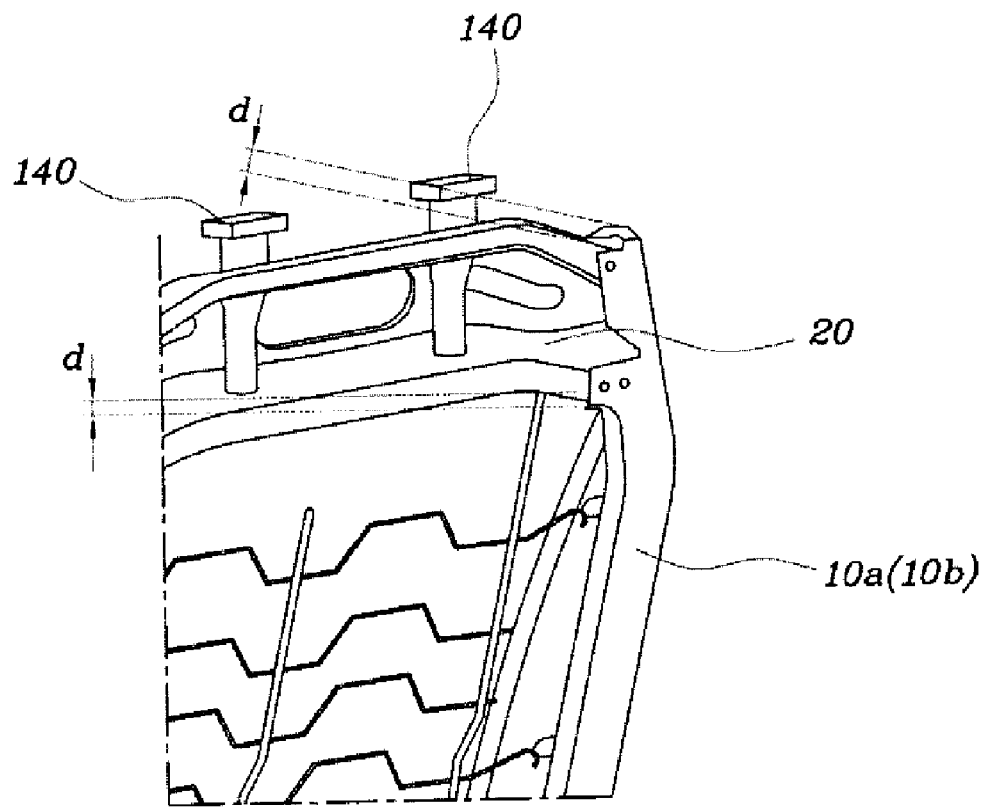
FIG. 5 is a view illustrating height adjusting gaps, which are provided between the upper cross member and a side bracket of an exemplary seatback frame structure for vehicles in accordance with the present invention.

Further, a height adjusting gap d is defined between each of the upper and lower ends of a welded portion which is provided on each of the opposite ends of the upper cross member 20 and each side bracket 10a or 10b. As shown in FIG. 5, the height adjusting gap d allows the position of the upper cross member 20 relative to the side brackets 10a and 10b to be changed in the vertical direction, thus adjusting the height of the upper cross member 20 which is mounted to the side brackets 10a and 10b.

Figure 6:
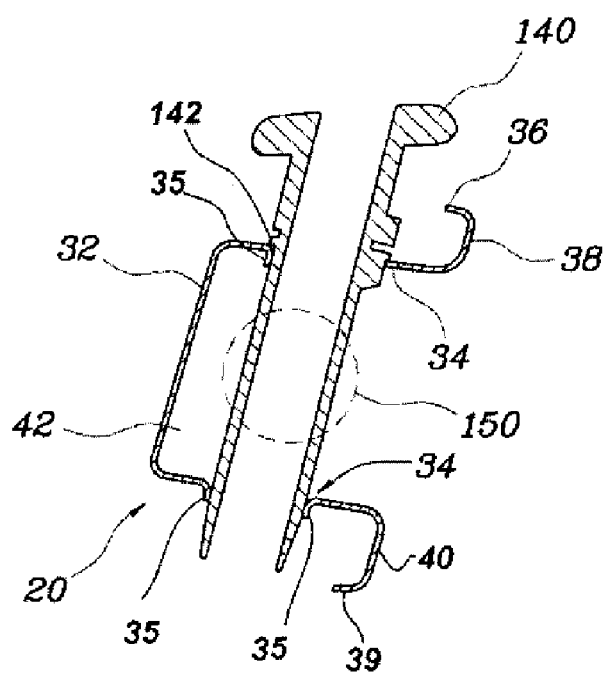
FIG. 6 is a sectional view showing the upper cross member of an exemplary seatback frame structure for vehicles in accordance with the present invention.

As shown in FIG. 6, the upper cross member 20 has a support portion 32 which is bent at the center thereof in a "U" shape and extends in the longitudinal direction thereof. The support portion 32 is bent outwards in multiple steps to increase the sectional area of the upper cross member 20, thus structurally increasing the strength of the upper cross member 20.

Further, holes 34 are formed in the vertical direction of the support portion 32. Around the holes 34, a receiving member 35 is formed downwards. The receiving member 35 is inclined toward the center of longitudinal axis of the guide pole 140 with a predetermined angle. Upper portion of each guide pole 140 includes a protrusion 142 extending radially with a predetermined length so that when each pole guide 140 is fitted into the corresponding holes 34, the pole guide 140 is secured to the protrusion 142. Since the receiving member 35 is inclined toward the center of longitudinal axis of the guide pole 140, the pole guide 140 is further strongly fastened to the support member 32.

This construction allows the pole guide 140 to be directly fitted into the holes 34 in the support portion 32, thus eliminating the conventional pole guide tube 145, therefore reducing the number of components and reducing manufacturing costs.

Further, an upper edge 36 of the upper cross member 20 is first bent upwards. Subsequently, the upper edge 36 is bent towards the front of the vehicle. Thereby, a round upper flange 38 is provided on the rear portion of the upper cross member 20. This construction provides an empty space 42 behind the support portion 32. A power motor 150, which is used to drive a power headrest, is installed in the empty space 42. Further, the empty space 42 is utilized as working space in which a working tool can be freely moved.

In the seatback frame structure 1, the opposite ends of the upper cross member 20 are welded to the upper ends of the left and right side brackets 10a and 10b. The height adjusting gaps d are defined between the upper and lower ends of each welded portion, which is provided on each of the opposite ends of the upper cross member 20, and each side bracket 10a or 10b. Since each height adjusting gap d is about 10 mm, the upper cross member 20 may freely move up and down about 20 mm relative to the side brackets 10a and 10b.

Thus, each height adjusting gap d allows the seatback frame structure of this invention to be universally utilized for vehicles having seatbacks which are higher or lower than a standard height.

Further, the linear portion 22 is provided on the central portion of the upper cross member 20. Since the inclined surfaces 26a and 26b are provided on the opposite ends of the linear portion 22 in such a way as to be inclined downwards, the upper edge 36 of the seatback may have a curved shape. Thus, this construction can be suitably applied to a vehicle which must be rounded at the upper ends of the sides of a seatback. As a result, the same frame structure may be used regardless of the kind of vehicle, without changing the side brackets 10a and 10b. Thereby, freedom of design is increased.

The upper cross member 20 has the support portion 32 which is bent at the central portion thereof in a "U" shape. Further, the upper cross member 20 includes the holes 34 into which each pole guide 140 is fitted. Thereby, the pole guide 140 can be directly fitted into the upper cross member 20 without the conventional pole guide tube 145.

Further, the upper edge 36 of the upper cross member 20 is bent upwards and then bent forwards to face the front of the vehicle and form the round upper flange 38 at the rear portion thereof. The lower edge 39 of the upper cross member 20 is bent downwards and then bent forwards to face the front of the vehicle and form the round lower flange 40 at the rear portion thereof. Thus, even if the head of a passenger sitting in the back seat collides with the round upper and lower flanges 38 and 39 in the event of a head-on collision, the passenger's head is not injured but is protected. Furthermore, in this configuration, the large empty space 42 is defined in back of the support portion 32 so that the power motor 150 may be smoothly installed in the empty space 42. The empty space 42 is utilized as working space in which the tool, required for the work of manufacturing the seatback, can be freely moved.

As described above, the present invention provides a seatback frame structure for vehicles, in which an upper cross member has a linear portion on the central portion thereof and has inclined surfaces on the opposite ends of the linear portion, and a height adjusting gap is provided between each side bracket and a welded portion of the upper cross member, thus allowing the height of a seatback to be adjusted depending on the kind of vehicle, and in which the upper end of a side of the seatback is rounded, thus allowing the same side bracket to be used regardless of the kind of vehicle. Thus, frame compatibility between vehicles is considerably improved, and various designs may be applied.

Further, according to the present invention, holes are formed in a support portion of the upper cross member so that a pole guide is fitted into the holes, thus reducing the number of components, therefore reducing manufacturing costs and weight, in addition to reducing the incidence of gaps and coupling defects in a headrest, due to product variation and welding variation. Therefore, the present invention achieves a vehicle seat having good quality.

Moreover, according to the present invention, in the event of a head-on collision, the rear edges of the upper cross member is bent in two steps in such a way that the upper edge extends upwards and forwards and the lower edge extends downwards and forwards, and a rear flanges have a round shape, thus preventing a passenger sitting in the back seat from being injured even if the passenger collides with the rear flanges. Further, the rear edges are bent upwards and downwards, thus ensuring a large mounting space for a power motor in the case in which a power headrest is installed, and minimizing interference in the working space, therefore increasing productivity.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seatback frame structure for vehicles comprising:
a pair of side brackets coupled at lower ends thereof to left and right sides of a seat frame; and
an upper cross member transversely mounted between upper ends of the side brackets and including a middle portion and inclined portions formed at distal ends of the middle portion, wherein each distal end of the inclined portions is configured to be lower than the middle portion; and
a headrest is mounted on an upper portion of the upper cross member;
wherein the upper cross member comprises a height adjusting gap defined between each of upper and lower ends of a welded portion provided on each of the opposite ends of the upper cross member and associated side brackets, the height adjusting gap allowing a height of the upper cross member mounted to the side brackets to be adjusted; and
wherein an upper end of each side bracket opens upwards.

2. The seatback frame structure as set forth in claim 1, wherein the middle portion is linear and substantially-horizontally aligned between upper ends of the side brackets.

3. The seatback frame structure as set forth in claim 2, wherein the inclined portions are linearly-shaped and inclined downwards from the distal end of the middle portion with a predetermined angle.

4. The seatback frame structure as set forth in claim 2, wherein the inclined portion is curved downwards from the distal end of the middle portion.

5. The seatback frame structure as set forth in claim 1, wherein the middle portion is curved and substantially-horizontally aligned between upper ends of the side brackets.

6. The seatback frame structure as set forth in claim 5, wherein the inclined portion is linearly-shaped and inclined downwards from the distal end of the middle portion with a predetermined angle.

7. The seatback frame structure as set forth in claim 5, wherein the inclined portion is curved downwards from the distal end of the middle portion.

8. The seatback frame structure as set forth in claim 1, the height adjusting gap is about 10 mm.

9. The seatback frame structure as set forth in claim 1, wherein the upper cross member comprises a support portion which is bent at a center thereof in a "U" shape opened in a direction of a back seat and extends in a longitudinal direction thereof.

10. The seatback frame structure as set forth in claim 9, wherein an upper edge of a support member is first bent upwards, and subsequently, is bent towards a front of a vehicle, so that an upper flange is provided on a rear portion of the upper cross member.

11. The seatback frame structure as set forth in claim 10, wherein a lower edge of the support member is first bent downwards, and subsequently, is bent towards a front of a vehicle, so that a lower flange is provided on a rear portion of the upper cross member.

12. The seatback frame structure as set forth in claim 9, wherein a lower edge of the support member is first bent downwards and subsequently is bent towards a front of a vehicle, so that a lower flange is provided on a rear portion of the upper cross member.

13. The seatback frame structure as set forth in claim 9, wherein a hole is formed through the support member in a vertical direction thereof so that a pole guide is fitted into the hole, wherein a receiving member is formed downwards around the hole and is inclined with a predetermined angle toward a central axis of the guide pole.

14. The seatback frame structure as set forth in claim 13, wherein a plurality of receiving members includes a first receiving member and a second receiving member disposed below the first receiving member, wherein the diameter of the second receiving member is smaller than the diameter of the first receiving member.

15. The seatback frame structure as set forth in claim 13, the pole guide includes a protrusion radially extending with a predetermined length at an upper portion of the pole guide.

16. The seatback frame structure as set forth in claim 1, wherein a hole is formed in a vertical direction of the upper portion of the upper cross member so that a pole guide is fitted into the hole.

17. The seatback frame structure as set forth in claim 16, wherein a receiving member is formed downwards around the hole and is inclined toward center of longitudinal axis of the guide pole with a predetermined angle.

18. The seatback frame structure as set forth in claim 17, the pole guide includes a protrusion radially extending with a predetermined length at an upper portion of the pole guide.

19. A passenger vehicle comprising the seatback frame structure as set forth in claim 1.

* * * * *